Patented Aug. 23, 1938

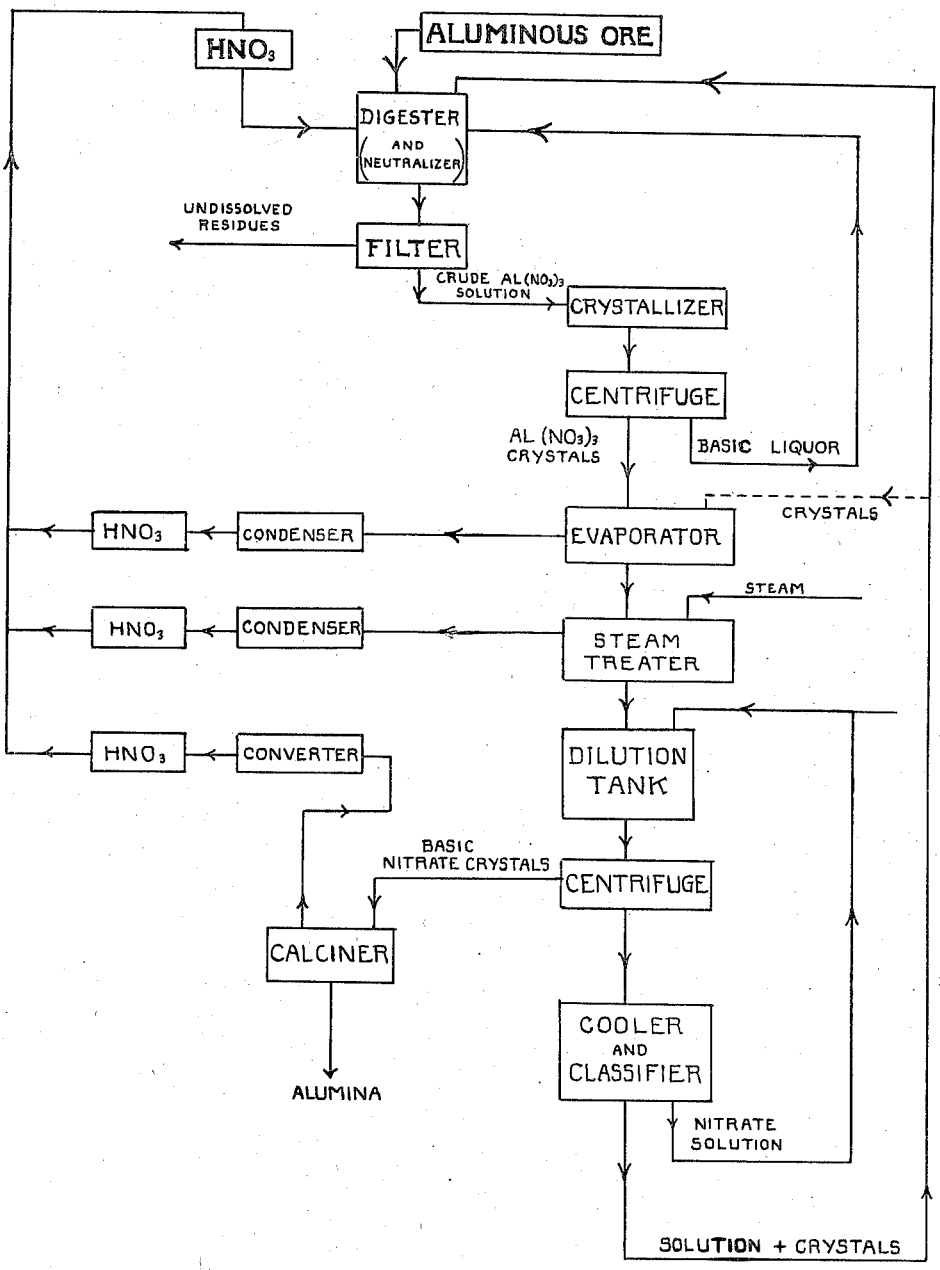

2,127,504

UNITED STATES PATENT OFFICE 2,127,504

ALUMINA PRODUCTION

Ralph B. Derr, Oakmont, and Henry B. Stere, New Kensington, Pa., assignors to Aluminum Company of America, Pittsburgh, Pa., a corporation of Pennsylvania Application December 18, 1935, Serial No. 55,126

15 Claims. (Cl. 23—143)

This invention relates to the production of alumina and salts of aluminum from bauxite, clay and other aluminous raw materials. More specifically, it relates to the production of alumina by a process involving the extraction of aluminous raw materials with nitric acid, and preferably including as intermediate steps the production of normal aluminum nitrate and basic aluminum nitrate.

Nitric acid processes for the production of alumina are not broadly new, as several processes of this general nature have been developed in the past and are described in the literature of this art. The principal object of this invention is to provide an improved process of recovering alumina from aluminum nitrate solutions, which process is free from the several disadvantages which have characterized prior processes of this general type. Other objects of the invention will appear hereinbelow.

A flow sheet of the process is shown in the accompanying drawing.

In the present process, as in the prior processes, bauxite, clay or other aluminous raw material is leached or digested at atmospheric or higher pressure with a nitric acid solution of suitable concentration. This solution may contain a fluorine compound or other activating agent which improves the extraction of alumina and suppresses the solution of the iron which usually accompanies alumina in raw materials, or which facilitates the removal of the iron, as described in the copending application of Willmore and Callis, Serial No. 623,394, filed July 19, 1932, now Patent No. 2,019,553, granted Nov. 5, 1935. After the extraction is completed the solution is still preferably somewhat acid, especially if the digestion is conducted at atmospheric pressure, as the yield of alumina is thereby improved. This aluminum nitrate solution, if acid, is then preferably neutralized or made slightly basic before separation from the solid residues of the raw material. This may conveniently be effected by adding basic mother liquor from a previous aluminum nitrate crystallization, as described in the copending application of R. B. Derr, Serial No. 623,399, filed July 19, 1932, now Patent No. 2,019,554, granted Nov. 5, 1935. Alternatively, the solution, whether acid or alkaline, may be separated immediately from the residues and sent to the concentration stage, with or without the addition of basic mother liquor or other alkaline material after the separation.

The acid, neutral, or preferably basic solution is then concentrated to a point at which a desired portion of its aluminum nitrate content crystallizes when the solution is cooled. Evaporating the solution to this concentration usually eliminates a substantial amount of nitric acid along with the water so that the solution increases in alkalinity as the concentration proceeds. It has been found, however, that the normal nitrate—usually in the form of the nonohydrate, $Al(NO_3)_3.9H_2O$—is the salt that crystallizes out over a wide range of acidity and basicity.

The normal aluminum nitrate nono-hydrate crystals, produced as described hereinabove or otherwise, melt in their own water of crystallization at a temperature of about 73° C., and they progressively lose water and oxides of nitrogen if the heating is continued above that point. Similarly, aluminum nitrate solutions otherwise obtained, such as the crude aluminum nitrate solutions obtained by the digestion of aluminous raw material with nitric acid, may be concentrated beyond the aluminum nitrate saturation point with similar results. The concentration of either of these materials, followed by calcination, can be continued with or without the addition of steam or water in some other form until the aluminum nitrate is decomposed into alumina and oxides of nitrogen. When this treatment is applied to crude aluminum nitrate solutions, however, the alumina produced is contaminated with iron and other impurities contained in the original solution. For that reason it is preferable to crystallize the normal nitrate and separate it from its mother liquor before decomposition, especially when a substantially pure grade of alumina is desired for reduction to metallic aluminum and other purposes.

The decomposition of aluminum nitrate by heating, with or without the addition of steam or water and sometimes of other reagents, has previously been disclosed, and it is known that if an aluminum nitrate solution is evaporated to a boiling point of about 140° to 150° C. the residue will solidify and it will be found that only about 25 per cent of the total nitric acid has been split off. It has also been disclosed, in U. S. Patent 1,413,754 to Mejdell, for example, that if the evaporation is not carried so far that the residue solidifies and if, instead, water or steam is added to keep the temperature of the solution down to about 140°, a much larger percentage of the nitric acid content may be driven off. This patent indicates that as much as 80 per cent of the combined nitric acid may be eliminated in this way without solidification of the residue, and also states that "at a certain basicity" most of the alumina content of the salt will precipitate in the form of a crystalline basic aluminum nitrate which can be filtered from the solution and then completely decomposed to aluminum oxide by heating without fusion. It appears that the inventor contemplated the treatment of crude aluminum nitrate solutions, as he describes difficulties encountered on account of the presence of iron after the initial precipitation of the basic nitrate.

The Mejdell patent describes what appears to be a material contribution to the art of nitric acid processes for the recovery of alumina, but the process has never been commercially successful and presents several disadvantages which are overcome by the present invention. Among these disadvantages there may be mentioned the enormous quantities of steam or heat energy in some other form which must be consumed to even approximate the extent of decomposition mentioned by Mejdell. Another and probably related disadvantage is the fact that the nitric acid recovered from Mejdell's process is necessarily very dilute. The patent mentions 20 per cent concentration, and also a concentration of 18 grams per 100 cc., which is equivalent to approximately 16.5 per cent, and these low concentrations are reached when removing only 60 per cent of nitric acid. It is obvious that if the 80 per cent removal mentioned earlier in the patent is obtained the concentration will be even lower. Also, it is difficult, if not impossible, by the Mejdell process to obtain alumina of satisfactory purity for most of the purposes for which it is used, or at a reasonable price.

The process constituting the present invention eliminates these disadvantages as well as others. Starting preferably with aluminum nitrate crystals of a fair degree of purity, prepared as described hereinabove or otherwise, the crystals are melted in their own water of crystallization and heated, preferably by indirect steam, to drive off about 20 to 35 per cent of the total nitric acid content—usually about 30 per cent—along with water vapor which may be condensed to form a solution containing 40 per cent to 50 per cent, and usually approximately 48 per cent nitric acid. At this point the melt is substantially completely fluid, although there may be some incipient crystallization of basic aluminum nitrate having a composition which apparently corresponds to the formula $Al(NO_3)_3.9H_2O.Al_2O_3$. The solution is then treated with water or steam, which is preferably introduced beneath the surface of the melt or solution while the temperature is maintained substantially constant at the boiling point of about 140° to 145° C., and this treatment is continued until about 20 per cent to 25 per cent more of the total nitric acid content—making a total acid removal of about 40 per cent to 55 per cent—is removed. The acid and water vapor driven off during this stage may be condensed to form a nitric acid solution having an average concentration of some 30 to 40 per cent $HNO_3$. One of the features of the invention is that the amount of steam required to drive off the nitric acid up to a total of about 50 per cent removal is relatively small, so that steam decomposition in this range is not expensive and it is possible to recover nitric acid of relatively high strength by simple condensation of the vapors evolved. After about 50 per cent of the total nitric acid has been removed, however, the amount of steam required per unit of nitric acid removed increases rapidly, and the concentration of the condensate decreases rapidly to 10 to 15 per cent $HNO_3$ or less. For this reason it is preferable to discontinue the steam treatment when a total of about 40 to 55 per cent, and preferably 45 to 50 per cent, of the nitric acid has been eliminated.

The residue from this treatment consists of a mixture of normal aluminum nitrate which is substantially dissolved or melted in its water of crystallization, along with some dissolved basic aluminum nitrate and some basic aluminum nitrate crystals. This mixture will of course solidify completely if allowed to cool, and it becomes "mushy" with only a slight decrease in temperature. Thus at this stage of the decomposition there is no convenient and economical method of separating the basic nitrate from the normal nitrate, and when once cooled the mixture cannot be heated without becoming melted or "mushy" again. It is therefore desirable to dilute the mixture with a solvent for the normal nitrate which will leave the major portion of the basic nitrate crystals undissolved. Water may be used for this purpose, but has the disadvantage that it dissolves a considerable proportion of the basic nitrate. We have found, however, that a solution of the normal nitrate and/or basic nitrate saturated at about 20° C. makes a satisfactory diluent for the residue from the steam treatment, as the rate of solution of basic nitrate in such a solution is much lower than the rate of solution in water. In fact, during the initial periods of contact with basic nitrate, several times as much dissolves in water as in a saturated nitrate solution at the same temperature. A solution of normal nitrate is suitable, but a solution containing basic nitrate is preferable in that the basic nitrate in the residue from the steam decomposition stage is, of course, less soluble in a solution already partially or completely saturated therewith.

The residue from the steam treatment, while still in the molten condition, is therefore mixed rapidly with a suitable quantity of cool saturated nitrate solution to give a resulting temperature which is preferably between 60° and 90° C. This mixture is then centrifuged or filtered quickly to separate the crystallized basic nitrate from the normal nitrate solution, which may also contain some dissolved basic nitrate, and the filtrate is cooled. Upon cooling, the excess normal nitrate above the saturation point crystallizes and forms a slurry with the saturated solution, which is run into a suitable classifier. Clear saturated solution may conveniently be decanted from this classifier and returned in suitable quantity to the dilution stage, where it is mixed with a further quantity of residue from the steam treatment. The temperature of the diluent solution is not critical, but the temperature of the diluted residue should be high enough to permit centrifuging or filtering to remove the basic aluminum nitrate crystals before the excess normal nitrate starts to crystallize, without being so high that the mixture reverts to a form in which it is difficult to separate. The rapidity with which the residue is diluted and the basic nitrate crystals are separated from the resulting solution also appears to have an important bearing on the facility and efficiency of the separation, as prolonged contact apparently causes the mixture to "revert" or the solvent to become more viscous and more difficult to filter.

The slurry of normal nitrate crystals in the somewhat basic solution of nitrates remaining after cooling may be worked up to recover its acid and alumina content directly, but where alumina of high purity is desired it is preferable to return the slurry to an earlier stage in the system. For example, it may conveniently be utilized to neutralize the acid liquor from the original digestion of a further quantity of aluminous material in nitric acid. The additional purification thereby provided is another meritorious feature of this invention.

The basic nitrate crystals separated from the nitrate liquor after the dilution stage may be recovered and marketed as such. In general, however, it is desirable to calcine them to thereby eliminate the remaining nitric acid. Basic nitrate crystallizes with a relatively low water content, and may be calcined without fusion. Upon calcination it gives off vapors which may be recovered in the form of nitric acid of 55 to 60 per cent concentration in known manner. This acid may be mixed with the acid obtained by condensing the vapors from the evaporator and steam treater to produce acid having an average concentration of about 45 to 50 per cent, or at least about 40 per cent. Thus, substantially all of the nitric acid employed in the process and contained in the normal nitrate crystals originally recovered is recovered in the form of a relatively concentrated solution of nearly 50 per cent strength. Also, the steam consumption is relatively small and the alumina obtained is of very high purity. This purity results from the double crystallization—first as normal nitrate, then as basic nitrate—and this crystallization also prevents undue dilution of the nitric acid vapors, which must be driven off and subsequently recovered.

It will be obvious to those skilled in the art that certain modifications of the specific conditions described hereinabove can be made without departing from the spirit of the invention or the scope of the appended claims.

We claim:

1. The process of producing basic aluminum nitrate, which comprises concentrating a solution of aluminum nitrate, adding aqueous fluid while heating the solution to a substantially constant temperature until a substantial portion of the normal nitric acid content is removed, mixing the residue containing normal and basic aluminum nitrates with an aqueous solvent for the normal aluminum nitrate selected from the group consisting of a solution of normal aluminum nitrate, a solution of normal and basic aluminum nitrates, and a solution of basic aluminum nitrate to form a solution in which at least a portion of the basic aluminum nitrate remains undissolved, and separating undissolved basic aluminum nitrate from the solution.

2. The process of producing basic aluminum nitrate, which comprises concentrating a solution of normal aluminum nitrate to a boiling point of about 140° to 150° C., keeping the temperature substantially constant while passing steam through the solution until a total of about 35 per cent to 55 per cent of the normal nitric acid content is removed without solidifying the residue of normal and basic aluminum nitrates, mixing the residue with an aqueous solvent for the normal aluminum nitrate selected from the group consisting of a solution of normal aluminum nitrate, a solution of normal and basic aluminum nitrates, and a solution of basic aluminum nitrate to form a solution in which at least a portion of the basic aluminum nitrate remains undissolved, and separating undissolved basic aluminum nitrate from the solution.

3. The process of producing basic aluminum nitrate, which comprises evaporating a concentrated solution of normal aluminum nitrate to a boiling point of about 140° to 145° C. to drive off water and about 20 per cent to 35 per cent of its total nitric acid content, adding sufficient aqueous fluid to keep the boiling point substantially constant while continuing heating to drive off about 20 per cent to 25 per cent more of the original nitric acid content, diluting the resulting mixture of normal aluminum nitrate and crystalline basic aluminum nitrate with an aluminum nitrate solution in which the normal aluminum nitrate remains dissolved while a substantial portion of the basic aluminum nitrate remains undissolved, and separating basic aluminum nitrate crystals from the solution.

4. The process of producing basic aluminum nitrate, which comprises evaporating a concentrated solution of substantially pure normal aluminum nitrate to a boiling point of about 140° to 145° C. to drive off water and up to about 30 per cent of its total nitric acid content, adding sufficient aqueous fluid to keep the boiling point substantially constant while continuing heating to drive off about 20 per cent to 25 per cent more of the original nitric acid content, combining the resulting hot mixture of fluid normal aluminum nitrate and crystalline basic aluminum nitrate with a cold substantially saturated solution of aluminum nitrate in which the normal nitrate is soluble at the resulting temperature while a substantial portion of the crystalline basic nitrate remains undissolved, separating basic aluminum nitrate crystals from the solution at a temperature above that at which normal aluminum nitrate crystallizes, cooling the solution to crystallize part of its normal aluminum nitrate content, and withdrawing cooled substantially saturated solution from the crystals.

5. The process of producing basic aluminum nitrate, which comprises evaporating a concentrated solution of substantially pure normal aluminum nitrate to a boiling point of about 140° to 145° C. to drive off water and up to about 30 per cent of its total nitric acid content, adding sufficient aqueous fluid to keep the boiling point substantially constant while continuing heating to drive off about 20 per cent to 25 per cent more of the original nitric acid content, combining the resulting hot mixture of fluid normal aluminum nitrate and crystalline basic aluminum nitrate with a cold substantially saturated solution of aluminum nitrate in which the normal nitrate is soluble at the resulting temperature while a substantial portion of the crystalline basic nitrate remains undissolved, separating basic aluminum nitrate crystals from the solution at a temperature above that at which normal aluminum nitrate crystallizes, cooling the solution to crystallize part of its normal aluminum nitrate content, withdrawing cooled substantially saturated solution from the crystals, and combining the withdrawn solution with a further quantity of the hot mixture of normal aluminum nitrate and crystalline basic aluminum nitrate.

6. The process of producing basic aluminum nitrate, which comprises indirectly heating a solution of normal aluminum nitrate which is supersaturated at normal temperature to evaporate water and drive off part of its nitric acid content without solidifying, continuing heating while adding sufficient aqueous fluid to keep the boiling point substantially constant at 140° to 145° C. and thereby driving off enough additional nitric acid to make the total removal equal to about 40 per cent to 55 per cent of the original nitric acid content, diluting the resulting mixture with an aqueous solvent for normal aluminum nitrate in which a substantial portion of the basic aluminum nitrate formed by the decomposition remains undissolved selected from the group consisting of a solution of normal aluminum nitrate, a solution of normal and basic aluminum nitrates, and a solution of basic aluminum nitrate, separating undissolved basic aluminum nitrate from the solution, subsequently separating normal aluminum nitrate from at least part of the solution, and mixing the part of the solution so separated with a further quantity of the mixture of basic and normal aluminum nitrates resulting from the decomposition treatment.

7. The process of producing alumina, which comprises heating substantially pure crystals of normal aluminum nitrate to form a concentrated solution of the salt in its water of crystallization, continuing heating to drive off water and about 20 per cent to 30 per cent of the total nitric acid content in the form of vapor, and further continuing the heating while introducing water in sufficient quantity to keep the boiling point substantially between 140° and 145° C. and thereby increasing the nitric acid removal to about 40 per cent to 55 per cent of the original nitric acid content, adding the resulting hot mixture of fluid normal aluminum nitrate and basic aluminum nitrate crystals to an aqueous solvent in which the normal nitrate is soluble while at least a portion of the basic nitrate remains undissolved in crystal form selected from the group consisting of a solution of normal aluminum nitrate, a solution of normal and basic aluminum nitrates, and a solution of basic aluminum nitrate, separating the basic aluminum nitrate crystals from the resulting solution, and calcining to decompose the basic nitrate into alumina and vapors containing oxides of nitrogen.

8. The process of producing alumina, which comprises heating substantially pure crystals of normal aluminum nitrate to form a concentrated solution of the salt in its water of crystallization, continuing heating to drive off water and about 20 per cent to 30 per cent of the total nitric acid content in the form of vapor, and further continuing the heating while introducing water in sufficient quantity to keep the boiling point substantially between 140° and 150° C. and thereby increasing the nitric acid removal to about 40 per cent to 55 per cent of the total, adding the resulting hot mixture of basic aluminum nitrate crystals and normal aluminum nitrate to an aqueous solvent in which the normal nitrate is dissolved while at least a portion of the basic nitrate remains undissolved in crystal form selected from the group consisting of a solution of normal aluminum nitrate, a solution of normal and basic aluminum nitrates, and a solution of basic aluminum nitrate, separating the basic aluminum nitrate crystals from the resulting solution, calcining to decompose the basic aluminum nitrate into alumina of high purity and vapors containing oxides of nitrogen, and recovering these vapors and the nitric acid vapors produced earlier in the process in the form of solutions having an average nitric acid concentration of at least about 40 per cent.

9. The process of producing alumina, which comprises heating substantially pure crystals of normal aluminum nitrate to form a concentrated solution of the salt in its water of crystallization, continuing heating to drive off water and about 20 per cent to 30 per cent of the total nitric acid content in the form of vapor, and further continuing the heating while introducing steam in sufficient quantity to keep the boiling point substantially between 140° and 145° C. and thereby increasing the nitric acid removal to about 40 per cent to 55 per cent of the total, adding the resulting hot mixture of fluid normal aluminum nitrate and basic aluminum nitrate crystals to an aqueous solvent in which the normal nitrate is soluble while at least a portion of the basic nitrate remains undissolved in crystal form selected from the group consisting of a solution of normal aluminum nitrate, a solution of normal and basic aluminum nitrates, and a solution of basic aluminum nitrate, separating the basic aluminum nitrate crystals from the resulting solution, calcining to decompose the basic aluminum nitrate into alumina of high purity and vapors containing oxides of nitrogen, recovering these vapors and the nitric acid vapors produced earlier in the process in the form of solutions of nitric acid, reacting the recovered nitric acid with aluminous raw material to produce crude aluminum nitrate solution, and recovering a further quantity of substantially pure normal aluminum nitrate crystals from the crude solution.

10. The process of producing alumina, which comprises heating substantially pure crystals of normal aluminum nitrate to form a concentrated solution of the salt in its water of crystallization, continuing heating to drive off water and about 20 per cent to 30 per cent of the total nitric acid content in the form of vapor, and further continuing the heating while introducing water in sufficient quantity to keep the boiling point substantially between 140° and 145° C. and thereby increasing the nitric acid removal to about 45 per cent to 50 per cent of the total, adding the resulting hot mixture of dissolved normal aluminum nitrate and basic aluminum nitrate crystals to an aqueous solvent in which the normal nitrate remains dissolved while at least a portion of the basic nitrate remains undissolved selected from the group consisting of a solution of normal aluminum nitrate, a solution of normal and basic aluminum nitrates, and a solution of basic aluminum nitrate, separating basic aluminum nitrate from the resulting solution, calcining to decompose the basic aluminum nitrate into alumina of high purity and vapors containing oxides of nitrogen, recovering these vapors and the nitric acid vapors produced earlier in the process in the form of solutions of nitric acid, treating raw aluminous material with an excess of recovered nitric acid solution to form an acid solution of crude aluminum nitrate, adding to the acid solution enough of the solution separated from the basic aluminum nitrate crystals to at least neutralize its acidity, and recovering a further quantity of substantially pure normal aluminum nitrate crystals from the solution.

11. The process of producing alumina, which comprises treating aluminous ore with nitric acid to form a crude solution of aluminum nitrate containing impurities including dissolved iron salts, recovering from the solution hydrated normal aluminum nitrate crystals of relatively low iron content as compared with the solution, applying indirect heat to melt the crystals in their water of crystallization and continuing heating to drive off water and nitric acid until a boiling point of about 140° to 145° C. is reached, condensing the vapors driven off to recover a nitric acid solution of at least about 40 per cent concentration, continuing heating the solution of partially decomposed aluminum nitrate and simultaneously adding sufficient aqueous fluid to prevent solidification of the melt and thereby increasing the nitric acid removal to about 35 per cent to 55 per cent of the original nitric acid content of the crystals, condensing the vapors driven off to recover a nitric acid solution having an average concentration of at least about 25 per cent $HNO_3$, mixing the resulting hot residue containing normal aluminum nitrate substantially dissolved in its water of crystallization and basic aluminum nitrate crystals with a cold saturated solution of aluminum nitrate in which the normal nitrate contained in the mixture dissolves at the resulting temperature while a substantial portion of the basic aluminum nitrate crystals remains undissolved in suspension, separating basic aluminum nitrate crystals from the solution at a temperature above that at which the normal nitrate crystallizes to a material extent, and decomposing the basic aluminum nitrate by heat to obtain alumina of high purity.

12. The process of producing alumina, which comprises treating aluminous ore with nitric acid to form a crude solution of aluminum nitrate containing impurities including dissolved iron salts, recovering from the solution hydrated normal aluminum nitrate crystals of relatively low iron content as compared with the solution, applying indirect heat to melt the crystals in their water of crystallization and continuing heating to drive off water and nitric acid until a boiling point of about 140° to 145° C. is reached, condensing the vapors driven off to recover a nitric acid solution of at least about 40 per cent concentration, continuing heating the solution of partially decomposed aluminum nitrate while introducing sufficient steam into the melt to prevent its solidification and thereby increasing the nitric acid removal to about 35 per cent to 55 per cent of the total nitric acid content, condensing the vapors driven off to recover a nitric acid solution having an average concentration of at least about 25 per cent $HNO_3$, mixing the resulting hot mixture containing normal aluminum nitrate substantially dissolved in its water of crystallization and basic aluminum nitrate crystals with a cold saturated solution of aluminum nitrate in which the normal nitrate contained in the mixture is soluble at the resulting temperature while a substantial portion of the basic aluminum nitrate remains undissolved in suspension, separating basic aluminum nitrate from the solution, calcining the basic aluminum nitrate to decompose it into substantially pure alumina and vapors containing oxides of nitrogen, and recovering the oxides of nitrogen in the form of concentrated nitric acid solution.

13. The process of producing alumina, which comprises treating aluminous ore with nitric acid to form a crude solution of aluminum nitrate, recovering from the solution hydrated normal aluminum nitrate crystals, melting the crystals in their water of crystallization and continuing heating to drive off water and nitric acid until a boiling point of about 140° to 145° C. is reached, condensing the vapors driven off to recover a nitric acid solution of at least about 40 per cent concentration, continuing heating the solution of partially decomposed aluminum nitrate in the presence of sufficient added aqueous fluid to prevent its solidification and thereby increasing the nitric acid removal to about 35 per cent to 55 per cent of the total nitric acid content, condensing the vapors driven off to recover a nitric acid solution of an average concentration of at least about 25 per cent $HNO_3$, diluting the resulting hot residue containing normal aluminum nitrate and basic aluminum nitrate crystals with a cold saturated solution of aluminum nitrate in which the normal nitrate contained in the mixture is dissolved at the resulting temperature while a substantial portion of the basic aluminum nitrate crystals remains undissolved in suspension, separating basic aluminum nitrate crystals from the solution at a temperature above that at which the normal nitrate crystallizes to a material extent, calcining the basic aluminum nitrate crystals to decompose them into alumina and vapors containing oxides of nitrogen, recovering the oxides of nitrogen as nitric acid solution, and employing recovered nitric acid solution to treat a further quantity of aluminous ore.

14. The process of producing alumina, which comprises treating aluminous ore with nitric acid to form a crude solution of aluminum nitrate containing impurities including dissolved iron salts, recovering from the solution hydrated normal aluminum nitrate crystals of relatively low iron content as compared with the solution, applying heat to melt the crystals in their water of crystallization and continuing heating to drive off water and nitric acid until a boiling point of about 140° to 145° C. is reached, condensing the vapors driven off to recover a nitric acid solution of at least about 40 per cent average concentration, continuing heating the solution of partially decomposed aluminum nitrate in the presence of sufficient added steam to prevent its solidification and thereby increasing the nitric acid removal to about 35 per cent to 55 per cent of the original nitric acid content, condensing the vapors driven off to recover a nitric acid solution of an average concentration of at least about 25 per cent $HNO_3$, mixing the resulting hot residue containing normal aluminum nitrate substantially dissolved in its water of crystallization and basic aluminum nitrate crystals with a cold saturated solution of aluminum nitrate in which the normal nitrate contained in the mixture remains dissolved at the resulting temperature while a substantial portion of the basic aluminum nitrate crystals remains undissolved in suspension, separating basic aluminum nitrate crystals from the solution at a temperature above that at which the normal nitrate crystallizes to a material extent, decomposing the basic aluminum nitrate crystals by heat to obtain alumina and vapors containing oxides of nitrogen therefrom, cooling the solution to crystallize part of its aluminum nitrate content, withdrawing part of the cool saturated solution from the remaining solution and the crystals of aluminum nitrate, mixing it with a further quantity of partially decomposed melt containing normal aluminum nitrate and basic aluminum nitrate, and separating a further quantity of basic aluminum nitrate crystals from the resulting solution.

15. The process of producing alumina, which comprises treating aluminous ore with nitric acid to form a crude solution of aluminum nitrate containing impurities including dissolved iron salts, recovering from the solution hydrated normal aluminum nitrate crystals of relatively low iron content as compared with the solution, applying indirect heat to melt the crystals in their water of crystallization and continuing heating to drive off water and nitric acid until a boiling point of about 140° to 145° C. is reached, condensing the vapors driven off to recover a nitric acid solution of at least about 40 per cent concentration, continuing heating the solution of partially decomposed aluminum nitrate in the presence of sufficient added aqueous fluid to prevent its solidification and thereby increasing the nitric acid removal to about 40 per cent to 55 per cent of the total nitric acid content, condensing the vapors driven off to recover a nitric acid solution having an average concentration of at least about 25 per cent $HNO_3$, diluting the resulting hot residue containing normal aluminum nitrate substantially dissolved in its water of crystallization and basic aluminum nitrate crystals with a relatively cold saturated solution of aluminum nitrate in which the normal nitrate contained in the mixture is soluble at the resulting temperature while a substantial portion of the basic aluminum nitrate crystals remains undissolved in suspension, separating basic aluminum nitrate crystals from the solution at a temperature above that at which the normal nitrate crystallizes to a material extent, decomposing the basic aluminum nitrate crystals by heat to obtain alumina and vapors containing oxides of nitrogen therefrom, mixing parts of the remaining solution of aluminum nitrates with a further quantity of crude aluminum nitrate solution from the digestion stage, and recovering a further quantity of normal aluminum nitrate crystals from the resulting solution.

RALPH B. DERR.
HENRY B. STERE.